United States Patent [19]

Day

[11] 4,108,204
[45] Aug. 22, 1978

[54] PRESSURE RELIEF VALVE

[75] Inventor: Ronald H. Day, Mill Valley, Calif.

[73] Assignee: C. J. Hendry Company, San Francisco, Calif.

[21] Appl. No.: 686,025

[22] Filed: May 13, 1976

[51] Int. Cl.² .............................................. F16K 15/06
[52] U.S. Cl. .................................. 137/543.13; 251/360
[58] Field of Search ............... 137/542, 543, 543.13, 137/515.7; 251/359, 360, 61.1

[56] References Cited
U.S. PATENT DOCUMENTS

| 1,297,312 | 3/1919 | Barker | 137/543.13 |
| 2,621,011 | 12/1952 | Smith | 251/359 X |
| 2,998,827 | 9/1961 | Cook et al. | 137/543.13 |
| 3,346,008 | 10/1967 | Scaramucci | 137/515.7 X |
| 3,707,987 | 1/1973 | Gordon | 137/543 |
| 3,983,899 | 10/1976 | Graham et al. | 137/543 X |

Primary Examiner—William R. Cline
Attorney, Agent, or Firm—Flehr, Hohbach, Test, Albritton & Herbert

[57] ABSTRACT

A pressure relief valve including a sleeve having means to be suitably attached to the walls of a container, the end of the sleeve remote from the wall carrying an annular shaped sealing edge cooperating with a spherically shaped piston resiliently urged toward the sealing edge by means of a conically shaped volute spring.

3 Claims, 1 Drawing Figure

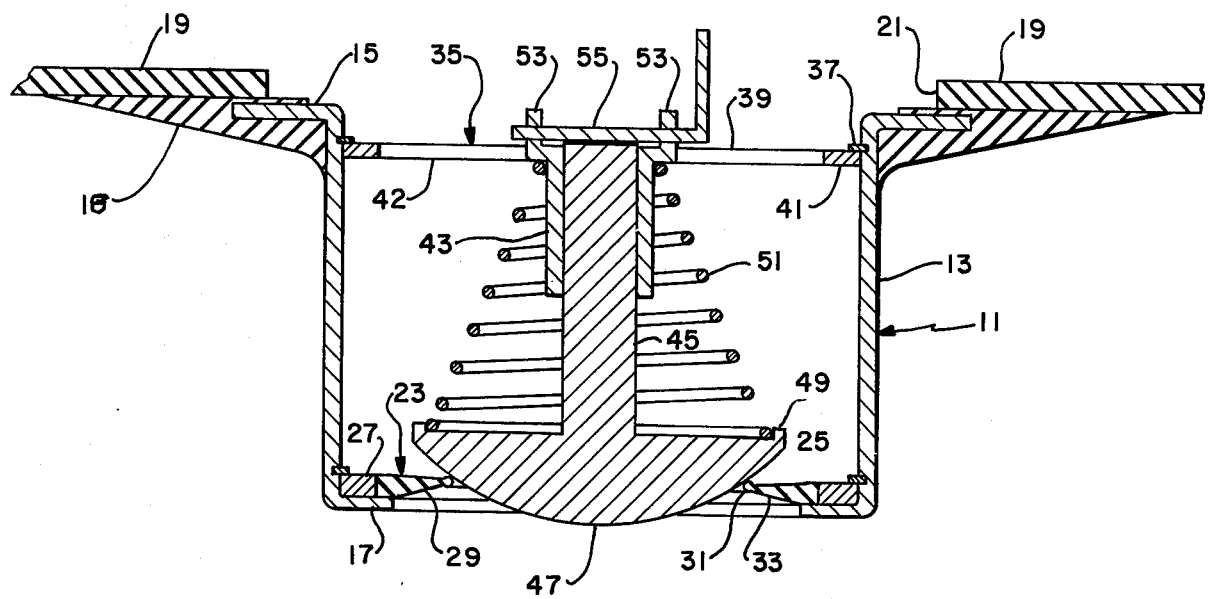

PRESSURE RELIEF VALVE

BACKGROUND OF THE INVENTION

Pressure relief valves have found many uses, one of which is in the construction of inflatable life rafts. Such life rafts are ordinarily inflated by means of a compressed gas cylinder which discharges the gas, usually carbon dioxide, to the interior of the raft. Care must be taken that the raft is not subjected to too high a pressure when inflated at very high temperature. On the other hand, sufficient gas must be inserted, even at very low temperatures, to insure proper inflation. In order to permit the raft to be inflated as quickly as possible a relatively high volume supply of gas must be provided and consequently, once the proper pressure is attained within the raft, the discharge capacity of the relief valve must be sufficient to permit that high volume of gas to be released. In the past, pressure relief valves employed in inflatable life rafts have been somewhat restrictive when it has been attempted to pass a large volume of gas. In order to make these valves sufficiently sturdy, safe and foolproof, the relative dimensions of its parts have left a relatively small orifice through which the gas may escape.

SUMMARY OF THE INVENTION AND OBJECTS

A pressure relief valve including a tubular housing adapted at one end to be connected to the wall of a container to be inflated and carrying at its opposite end an O-ring seal secured to the tube by means of a relatively thin flexible membrane. A spherically shaped piston is urged against the O-ring by means of a conical spring.

BRIEF DESCRIPTION OF THE DRAWING

The single FIGURE is an elevation view, partly in section, showing pressure valve in accordance with the invention.

DESCRIPTION OF THE PREFERRED EMBODIMENT

Referring to the FIGURE, the relief valve includes a tubular shaped housing 11, including cylindrical side walls 13, an outwardly extending annular flange 15 at one end and an inwardly extending annular flange 17 at the opposite end. The outwardly extending flange 15 carries an annular rubber flange 18 bonded to the walls 19 of an inflatable life raft in alignment with an opening 21 in that outer wall 19.

A sealing ring 23 is held secure against the internally directed flange 17 by means of a spring clip 25, or the like. The sealing ring includes an annular aluminum member 27 having a silicon rubber ring 29 bonded thereto. The silicon rubber ring includes an O-ring portion 31 at its inner extremity and a relatively thin annular flexing portion 33 extending between the O-ring portion 31 and the aluminum member 27. The thin portion 33 provides a great deal of flexibility in the sealing ring while the larger O-ring portion 31 serves to withstand the forces and friction exerted by cooperating pistons.

At the upper end of the cylindrical portion 13 is a spider-sleeve element 35. A spring clip 37 serves to retain the element 35 against outward movement. The element 35 includes a spider portion 39 terminating at its outer ends in a ring 41 which cooperates with the spring clip 37. A number of radially extending spider legs 42 interconnect the outer ring 41 with a sleeve portion 43. A piston 45 is slidably carried within the sleeve 43 and terminates at its lower end with a spherically shaped sealing surface 47. At the upper edge of the sealing surface 47 there is formed an annular flange 49 which serves to receive and retain one end of a conical voluted spring 51. The upper end of the spring 51 is received and retained at the junction of the sleeve portion 43 and spider element 39.

The spider sleeve element 35 may also include upwardly extending tabs 53 having openings therethrough through which a pin 55 may be removably disposed so as to restrict outward movement of the piston 45. In normal operation of the valve, however, the pin 55 is removed so that the piston 45 may be freely urged outwardly against the spring 51 by pressure against the surface 47.

In operation pressure against the spherical surface 47 urges the piston 45 outward through the sleeve 43 and away from the sealing ring 23. Movement of the spherical surface 47 upward away from the sealing element 23 permits passage of gas through the annular opening formed between the spherical surface 47 and the O-ring 41; around the outer perimeter of the spherical surface 47 and up through the spider 35.

If the spring were cylindrical rather than conical, one of two separate problems would result. If a cylindrical spring were placed adjacent the annular flange 49, its coils would restrict the flow of gas. If such a spring were placed closer to the sleeve 43 and piston 45, there would be a tendency for its coils to catch on the lower edge of the sleeve.

The conical spring, of course, avoids both of these problems.

Normally in order to obtain a good seal at low pressures the sealing lip must be very thin. A thin lip, however, is subject to deformation and damage. The sealing element incorporated in the present invention avoids these problems by providing an enlarged O-ring portion 31 which provides a rugged surface to protect against deformation and damage while at the same time incorporating a relatively thin portion 33 to permit a high degree of pliability and a good seal at low pressure. Moreover, the enlarged O-ring portion 31 reduces the possibility of flutter of the sealing element when the valve is slightly open.

The spherical surface 47 permits substantially lower manufacturing tolerances. Even if the piston 45 is cocked within the sleeve 43 the same spherical surface will contact the O-ring 31.

The conical spring not only permits the aforementioned advantages but also provides a narrow range of operating pressure particularly when those pressures are relatively low, such as about 5 pounds per square inch. Moreover, the operating range of the valve can be changed simply by replacing the spring 51 with another spring of greater or lesser compression strength.

In instances when it is advantageous to test the remainder of the raft against leaks the pressure relief valve may be sealed in its closed position by merely inserting the pin 55 and thereby preventing the spherical surface 47 from being unseated from the sealing element 23 despite any increase in pressure against the valve.

What is claimed is:

1. A pressure relief valve comprising a housing having one end thereof adapted to be secured at a wall of a fluid containing vessel about an opening therein, a rigid flange at the opposite end thereof defining a valve passage therein, an entirely flexible valve seat having an opening therein and being secured in said valve passage adjacent said rigid flange, a piston having a sealing surface at one end thereof, said piston being sufficiently large to engage said flexible valve seat about the entire periphery of the opening therein but sufficiently small to pass freely through said valve passage in the rigid flange, said piston being slidably disposed within said housing whereby said sealing surface is movable toward and away from said valve seat, said valve seat comprising "O" ring means for engagement with said sealing surface, and an annular flexing portion thinner than the diameter of said "O" ring means and integrally connected to said "O" ring means, a conical volute spring disposed about said piston, the large diameter end of said spring being urged against said one end of the piston, and means for restraining the small diameter end of said spring against movement whereby said spring resiliently urges the sealing surface toward the valve seat.

2. A pressure valve as defined in claim 1 wherein said sealing surface is spherical.

3. A pressure valve as defined in claim 1 together with means removably connected adjacent said piston for selectively preventing movement of said piston away from said valve seat.

* * * * *